May 27, 1952          J. F. NOVY          2,597,895
REMOTE LOCATION AND IDENTIFICATION SYSTEM
Filed Sept. 23, 1944          2 SHEETS—SHEET 1
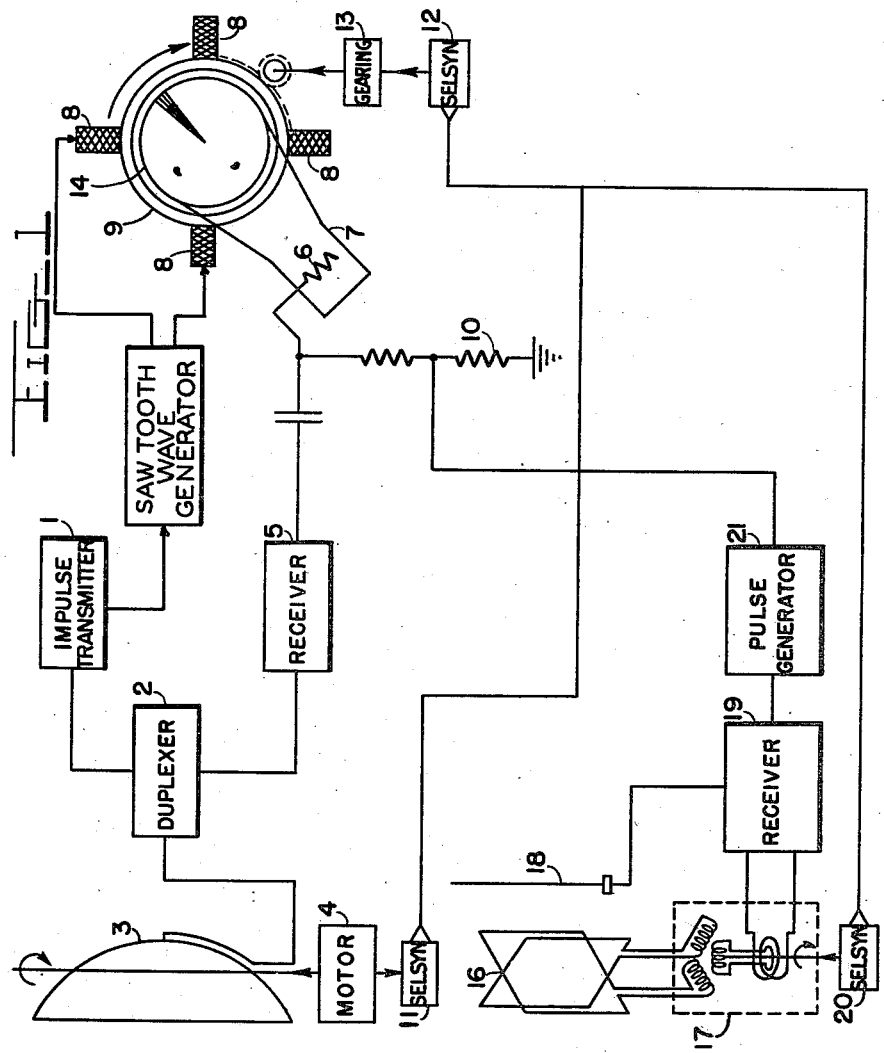
Inventor
JOSEPH F. NOVY
By W. Glen Jones
Attorney

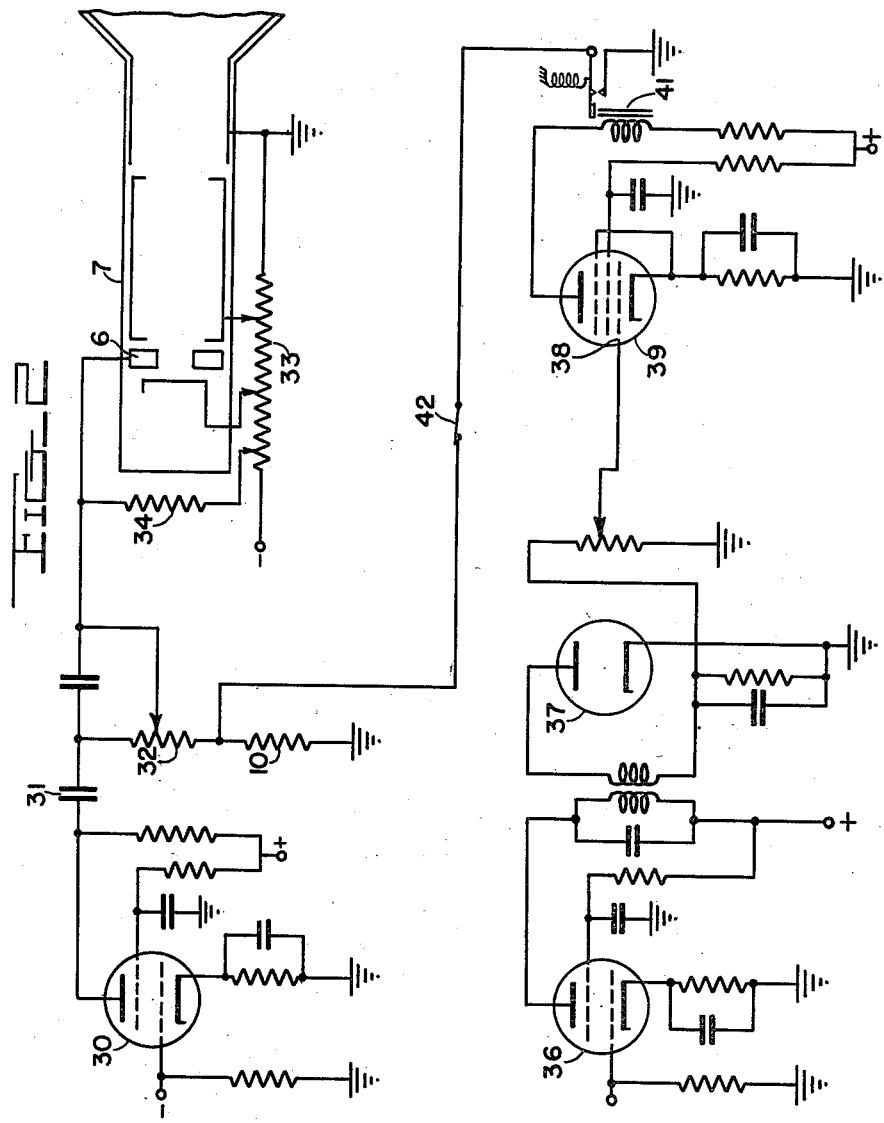

Patented May 27, 1952

2,597,895

UNITED STATES PATENT OFFICE 2,597,895

REMOTE LOCATION AND IDENTIFICATION SYSTEM

Joseph F. Novy, United States Navy

Application September 23, 1944, Serial No. 555,567

8 Claims. (Cl. 343—6)

(Granted under the act of March 3, 1883, as amended April 30, 1928; 370 O. G. 757)

This invention relates to the problem of remote obstacle identification, and is particularly directed to the identification of objects detected by a space scanning echo ranging system.

In space scanning echo ranging systems, it is customary to indicate the spatial distribution of obstacles map-wise in plan position. The presentation, as normally effected by a cathode ray tube, is composed of closely adjacent intensity modulated traces, which may radiate from a center corresponding to the locator installation. The direction of obstacles is correlated with the position of the trace indicating the same with relation to a fiducial position, and the range is shown by the position of the indication along the trace.

In the employment of such systems it is often highly desirable to identify a particular obstacle. This may be exceedingly difficult, particularly where one of a group of similar ships or aircraft, for instance, is concerned. Proper identification may be critical in "talking down" aircraft, since landing directions intended for one ship may be actually communicated by radio to another ship in a different location. Consequently where such operations are conducted with the aid of a locator showing the distribution of a group, it is necessary to distinguish the desired ship from others of the group. Accordingly, it is proposed to modify the indication pattern to identify the indication of an object in dependency on a singular characteristic thereof. Conveniently, this may be in dependency on an energy signal emitted by the object which, in a talk-down system, constitutes radio signals radiated thereby in the communication channel.

It is, therefore, among the objects of the invention to provide an obstacle locator with means for characterizing the indication pattern in accordance with an identifying characteristic of an obstacle.

Another object of the invention is to provide indicating means simultaneously responsive to a remote obstacle detector and to a directive energy receiving system to indicate an obstacle emitting energy so as to be distinguishable from an obstacle not emitting energy.

The invention will be further described with reference to the drawings, in which:

Fig. 1 shows in block diagram a representative embodiment of the present invention, and Fig. 2 shows certain circuit components of elements of Fig. 1.

The exemplary system shown in Fig. 1 comprises a radio echo locator for determining direction and range of remote obstacles, and a radio direction finder responsive to signals which may be radiated by such obstacles for the purpose of identification or otherwise.

The radio echo system may be provided with substantially conventional components, including an impulse transmitter 1 generating wave groups of high frequency energy which are supplied through a duplexing arrangement 2 to radiator 3. The latter comprises a rotatably mounted parabolic reflector which in the system shown is continuously rotated by motor 4. The echo signals returned from objects irradiated by the transmitted impulse are communicated to the input of receiver 5 by duplexer 2. The output of receiver 5 is applied to the beam current controlling grid 6 of a cathode ray tube indicator 7. This tube is provided with a rotating magnetic deflection yoke comprising coils shown diagrammatically at 8. The coils are mounted about the tube on rotatable ring 9 which is driven in synchronism with antenna 3. For this purpose motor 4 drives selsyn 11 controlling selsyn 12 which is suitably coupled to ring 9 through gearing 13.

Sweep currents are established in coils 8 by a sweep generator to deflect the electron beam radially from the center of screen 14 to the periphery thereof. The inauguration of the sweep movement is synchronized with the operation of the transmitter 1, so that the obstacle range is indicated by the length of the radius vector of the echo indication. As is apparent from the synchronous rotation of the antenna and the deflection coils, the radius vector of an object indication also gives the direction of the obstacle from the installation.

In a typical system, the radiator system may be rotated at 20 r. p. m., and the transmitter impulse frequency may be 60 cycles per second. This general type of locator system is disclosed in application S. N. 455,582 filed August 21, 1942 by Robert M. Page for Radio Echo Apparatus. A magnetic sweep system is disclosed in application S. N. 459,010 filed September 9, 1942 by Robert M. Page for Radio Echo Apparatus.

The system disclosed in Fig. 1 also includes means responsive to an identifying characteristic of an obstacle. The latter consists of an energy signal emitted by the obstacle, which signal in this case may be a radio transmission. The directional energy responsive means shown is a radio direction finder. This may be substantially conventional in its essentials, and as shown in Fig. 1 includes a pair of crossed loops 16 feeding goniometer 17. Nondirectional antenna 18 is also provided, and its output together with that of the goniometer are combined in receiver 19. As is well known, the effective directivity pattern of the antenna system is a cardioid whose orientation is determined by the phasing effected at the goniometer.

The latter is controlled by selsyn 20 which is rotated under control of selsyn 11 in synchronism with the radio echo system antenna 3. The directive receiving system is preferably adjusted to have its null substantially aligned with the radiated beam of antenna 3. Consequently, as the goniometer 17 is rotated with the receiver 19 tuned to the transmission frequency of an obstacle, the receiver output will fall to a minimum at the same time that the echo indication of the obstacle is applied to the screen 14 of the indicator tube 7. The receiver output is delivered to an impulse generator 21 which in turn supplies a control voltage to grid 6 of tube 7 and modifies the radial trace in which the obstacle is indicated to distinguish said obstacle indication from that of a nontransmitting obstacle.

In the system shown, the voltage developed across grid resistor 10 of the cathode ray indicator tube is shifted by the operations of impulse generator 21 to brighten the trace or traces which apply the obstacle indication to screen 14. Normally the quiescent beam current level during the trace is such as to give practically no visible screen indication, and consequently the screen background is dark. The increased beam current effected on indication of a transmitting obstacle establishes a visible radial trace or pencil of traces passing through the obstacle indication and thus identifies the same. In effect, this applies to the visible indication pattern a bright radial line directed toward the radiating obstacle. The increased beam intensity also increases the intensity of the obstacle indication itself to further characterize the indication, and preserves the contrast between the latter and adjacent portions of the traces.

A diagrammatic representation of the indication of three obstacles, one of which is transmitting, is shown on screen 14 in Fig. 1.

A schematic diagram of the output stages of the radio echo and the direction finding receivers, with associated circuits feeding the indicator tube, is shown in Fig. 2. The echo signal is supplied from tube 30 constituting the output video stage of the echo receiver. This signal is fed to grid 6 through coupling condenser 31. The grid signal is developed across grid resistors 32 and 10.

The electron gun elements are energized by potentials developed on divider 33. The quiescent grid bias, as shown, is determined by the voltage divider action of resistors 10 and 32, and resistor 34 connecting the grid to divider 33. Resistor 32 is adjustably tapped to select the desired quiescent intensity level.

The direction finder receiver includes output stage 36 feeding detector 37, which supplies an output of negative polarity to grid 38 of tube 39. Tube 39 with its associated plate circuit relay 41 and grid resistor 10 of the indicator tube constitutes the impulse generator.

The operation of tube 39 in response to the received output is to close relay 41 on the signal minima and thus short out grid resistor 10, thereby to shift the grid positive and increase the trace intensity as above described.

This is effected by operating tube 39 in a normally conducting condition, holding relay 41 closed. Upon introduction to grid 38 of the negative receiver output signal, the tube is biased off sufficiently to permit relay 41 to open, except on the sharp signal minima. At these points, the relay closes momentarily to short around grid resistor 10 and thus raise the potential of grid 6 during alignment of the directive receiver null with the radiating obstacle. As above described, this coincides with the same orientation of the radio echo antenna, and consequently the appropriate sweep traces and obstacle indications are characteristically intensified.

Switch 42 is provided to disconnect the direction finder for normal operation of the radio echo system.

It is apparent that the system of the present invention is widely applicable both to stationary as well as mobile installations, and is susceptible of many embodiments other than the exemplary one described in detail. The scope of the invention will therefore be ascertained by reference to the appended claims.

The invention described herein may be manufactured and used by or for the Government of the United States of America for governmental purposes without the payment of any royalties thereon or therefor.

I claim:

1. In combination, a space scanning radio echo obstacle locating system, a space scanning directional radio receiving system, indicating means responsive to the radio echo system operative to indicate the range and direction of obstacles, and means responsive to the directional receiving system operative to characterize the obstacle indication pattern to indicate the direction of an obstacle emitting a radio signal.

2. In combination, a space scanning radio echo obstacle detecting system, cathode ray tube indicating means responsive to said system operative to indicate the spatial distribution of obstacles detected by said system, a space scanning directional energy receiving system adapted to determine the direction of energy received from a remote point, and means in said cathode ray tube indicating means responsive to the output of the directional receiving system operative to indicate the direction of received energy, whereby an obstacle transmitting energy may be identified.

3. In combination, a space scanning pulse radio echo obstacle detecting system, space-scanning directional radio receiver means responsive to radiation from a remote point, means operative to space scan said obstacle detecting system and said directional radio receiver in synchronism, and cathode ray tube indicating means responsive to the radio echo system to indicate the spatial distribution of obstacles and to the directional receiver means to intensify the indication of a radiating obstacle.

4. In combination, a directional space scanning radio echo obstacle detection system, a space scanning direction finding radio receiving system including a rotatable, directional sensitivity pattern for determining the direction of energy radiated from a remote point, a cathode ray tube indicator including a beam controlling electrode therefor and beam deflection means for deflecting the beam in closely adjacent traces indicative of the instantaneous directivity of the space scanning radio echo detection system, coupling means for feeding the output from said radio echo space scanning system to the beam controlling electrode of said indicator to indicate spatial distribution of obstacles, and means responsive to the output from said direction finding receiving system to apply a signal to said beam controlling electrode to indicate the direction of an obstacle emitting energy.

5. In combination, a directional space scanning radio echo obstacle detection system, a space scanning direction finding radio receiving system including a rotatable, directional sensitivity pattern for determining the direction of energy radiated from a remote point, a cathode ray tube indicator including a beam controlling electrode therefor and radial beam deflection means for deflecting the beam in closely adjacent radial paths indicative of the instantaneous directivity of the space scanning radio echo detection system, coupling means for feeding the output from said radio echo space scanning system to the beam controlling electrode of said indicator to indicate the spatial distribution of obstacles, and means responsive to the output from said direction finding receiving system to apply a signal to said beam controlling electrode to indicate the direction of an obstacle emitting energy.

6. In combination, a directional space scanning radio echo obstacle detection system, a directional space scanning radio receiving system for determining the direction of energy radiated from a remote point, means operative to space scan both of said systems in synchronism, a cathode ray tube indicator including a beam controlling electrode therefor and beam deflection means for deflecting the beam in closely adjacent traces indicative of the instantaneous directivity of the space scanning radio echo detection system, coupling means for feeding the output from said radio echo space scanning system to the beam controlling electrode of said indicator to indicate the spatial distribution of obstacles, and means responsive to the output for said directional receiving system to apply a signal to said beam controlling electrode to indicate the direction of an obstacle emitting energy.

7. In combination, a directional space scanning radio echo obstacle detection system, a space scanning direction finding radio receiving system including a rotatable, directional sensitivity pattern for determining the direction of energy received from a remote point, a cathode ray tube indicator including a beam intensity control electrode and radial deflection means for deflecting the beam of said indicator in closely adjacent radial paths indicative of the instantaneous position of the directivity of the space scanning radio echo detective system, coupling means for feeding the output signal derived from said radio echo space scanning system to said beam intensity control electrode to indicate the spatial distribution of obstacles, and means responsive to the output from said space scanning direction finding receiving system to apply a signal to said beam intensity control electrode to indicate the direction of obstacles emitting energy.

8. In combination, a directional space scanning radio echo obstacle detection system, a directional space scanning radio receiving system for determining the direction of energy received from a remote point, means operative to space scan both said systems in synchronism, a cathode ray tube indicator including a beam intensity control electrode and radial deflection means for deflecting the beam of said indicator in closely adjacent radial paths indicative of the instantaneous position of the directivity of the space scanning radio echo detection system, coupling means for feeding the output signal derived from said radio echo space scanning system to said beam intensity control electrode to indicate the spatial distribution of obstacles, and means responsive to the output from said space scanning directional receiving system to apply a signal to said beam intensity control electrode to indicate the direction of obstacles emitting energy.

JOSEPH F. NOVY.

REFERENCES CITED

The following references are of record in the file of this patent:

UNITED STATES PATENTS

| Number | Name | Date |
| --- | --- | --- |
| 2,209,191 | Dearing | July 23, 1940 |
| 2,252,083 | Luck | Aug. 12, 1941 |
| 2,263,377 | Busignies et al. | Nov. 18, 1941 |
| 2,395,966 | Goldberg | Mar. 5, 1946 |
| 2,401,432 | Luck | June 4, 1946 |
| 2,426,217 | Hoisington | Aug. 26, 1947 |
| 2,428,793 | Fay | Oct. 14, 1947 |
| 2,448,016 | Busignies | Aug. 31, 1948 |
| 2,456,666 | Agate | Dec. 21, 1948 |
| 2,466,711 | Kenyon | Apr. 12, 1949 |
| 2,471,373 | Joyner | May 24, 1949 |
| 2,515,178 | Barchok | July 18, 1950 |
| 2,537,102 | Stokes | Jan. 9, 1951 |

FOREIGN PATENTS

| Number | Country | Date |
| --- | --- | --- |
| 542,634 | Great Britain | Jan. 21, 1942 |
| 108,556 | Australia | Sept. 28, 1939 |